United States Patent [19]

Herrmann et al.

[11] Patent Number: 5,524,981

[45] Date of Patent: Jun. 11, 1996

[54] MOLDED REFRIGERATOR SHELF AND SUPPORT BRACKET

[75] Inventors: Robert S. Herrmann, Grand Havens; Edmund J. Kane, Holland; Donald C. Gilbert, Muskegon Heights, all of Mich.

[73] Assignee: Donnelly Technology, Inc., Holland, Mich.

[21] Appl. No.: 130,596

[22] Filed: Oct. 1, 1993

Related U.S. Application Data

[63] Continuation of Ser. No. 721,104, Jun. 25, 1991, Pat. No. 5,273,354.

[51] Int. Cl.⁶ .................................................... A47B 96/04
[52] U.S. Cl. .................................... 312/408; 108/108
[58] Field of Search ........................... 312/408; 108/108, 108/107; 211/187, 193

[56] References Cited

U.S. PATENT DOCUMENTS

| | | |
|---|---|---|
| D. 295,950 | 5/1988 | Johnston . |
| 392,061 | 10/1888 | Peckham . |
| 786,935 | 4/1905 | Wright . |
| 870,439 | 11/1907 | Kade . |
| 907,423 | 12/1908 | Tilley . |
| 1,119,982 | 12/1914 | Ohnstrand . |
| 1,805,584 | 5/1931 | Kemp . |
| 1,878,072 | 9/1932 | Vance . |
| 2,169,295 | 8/1939 | Shuart . |
| 2,197,982 | 4/1940 | O'Brien . |
| 2,252,997 | 8/1941 | Vanderveld . |
| 2,505,322 | 4/1950 | Drake . |
| 2,518,825 | 8/1950 | Scweller . |
| 2,537,804 | 1/1951 | Watkins . |
| 2,568,153 | 9/1951 | Hickman . |
| 2,599,607 | 6/1952 | Burrise . |
| 2,604,375 | 7/1952 | Beckett . |
| 2,613,818 | 10/1952 | Richard . |
| 2,626,773 | 1/1953 | Backman . |
| 2,657,894 | 11/1953 | Sklenar . |
| 2,681,786 | 6/1954 | Sparring . |
| 2,689,778 | 9/1954 | Chambers et al. . |
| 2,735,741 | 2/1956 | Laben . |
| 2,739,777 | 3/1956 | Schoenhardt . |
| 2,954,125 | 9/1960 | Husted . |
| 3,028,638 | 4/1962 | Goellner . |
| 3,082,880 | 3/1963 | Mapson . |
| 3,092,047 | 6/1963 | Chesley . |
| 3,102,499 | 9/1963 | Shelor . |
| 3,120,077 | 2/1964 | Stoffel . |
| 3,127,146 | 3/1964 | Fisher . |
| 3,185,315 | 5/1965 | Andreassen . |
| 3,212,836 | 10/1965 | Johnson . |

(List continued on next page.)

FOREIGN PATENT DOCUMENTS

| | | |
|---|---|---|
| 2111257 | 5/1972 | France . |
| 8535795 | 3/1986 | Germany . |
| 9006513 | 9/1990 | Germany . |
| 9004180 | 9/1991 | Germany . |
| 320487 | 10/1929 | United Kingdom . |
| 1002175 | 7/1961 | United Kingdom . |

*Primary Examiner*—Peter M. Cuomo
*Assistant Examiner*—Gerald A. Anderson
*Attorney, Agent, or Firm*—Van Dyke, Gardner, Linn & Burkhart

[57] ABSTRACT

A molded refrigerator shelf useful for containment of spills on the shelf includes a shelf member with a rim molded around the perimeter edge of the shelf member to form a liquid tight seal between the rim and the shelf member. The molded rim projects above the top surface of the shelf member to form a liquid dam for containing spills to the shelf member. The shelf is cantilevered upon support brackets from the rear wall of a refrigerator. The support brackets are adapted to support the shelf at a plurality of vertical positions. The support brackets are integrally molded with the molded rim, or separately formed and attached to the rim during molding. Slide tracks are optionally provided on the support brackets for slidably receiving and supporting a storage bin or drawer beneath the shelf. Also, a drain is optionally provided to drain a spill from the shelf.

24 Claims, 5 Drawing Sheets

U.S. PATENT DOCUMENTS

| | | |
|---|---|---|
| 3,220,364 | 11/1965 | Sandin . |
| 3,270,404 | 9/1966 | Andreassen . |
| 3,331,646 | 7/1967 | Peters . |
| 3,352,431 | 11/1967 | Smith . |
| 3,363,390 | 1/1968 | Crane et al. . |
| 3,429,628 | 2/1969 | Laszlo . |
| 3,446,361 | 5/1969 | Douty . |
| 3,561,714 | 2/1971 | Zurawski et al. . |
| 3,575,484 | 4/1971 | Kesling . |
| 3,603,274 | 9/1971 | Ferdinand et al. . |
| 3,604,669 | 9/1971 | Asher . |
| 3,633,983 | 1/1972 | Whitcomb . |
| 3,672,624 | 6/1972 | Keller . |
| 3,862,784 | 1/1975 | Heirich . |
| 3,912,085 | 10/1975 | Cooke et al. . |
| 3,984,163 | 10/1976 | Boorman, Jr. et al. . |
| 4,015,543 | 4/1977 | Stankowitz . |
| 4,072,340 | 2/1978 | Morgan . |
| 4,139,234 | 2/1979 | Morgan . |
| 4,167,259 | 9/1979 | Bury . |
| 4,174,486 | 11/1979 | Winkler . |
| 4,242,848 | 1/1981 | Schoultz . |
| 4,543,283 | 9/1985 | Curtze et al. . |
| 4,627,201 | 12/1986 | Hamamoto et al. . |
| 4,723,809 | 2/1988 | Kida et al. . |
| 4,735,470 | 4/1988 | Falk ................................ 312/246 |
| 4,736,918 | 4/1988 | Bessinger . |
| 4,822,656 | 4/1989 | Hutter, III . |
| 4,841,698 | 6/1989 | Gold . |
| 4,870,907 | 10/1989 | McKee . |
| 4,923,260 | 5/1990 | Poulsen . |
| 4,934,541 | 6/1990 | Bussan et al. . |
| 4,938,442 | 7/1990 | Mastrodicasa . |

MOLDED REFRIGERATOR SHELF AND SUPPORT BRACKET

This is a continuation of application Ser. No. 07/721,104, filed Jun. 25, 1991 now U.S. Pat. No. 5,273,354.

BACKGROUND OF THE INVENTION

This invention relates to shelving for refrigerators and the like.

As is the nature of articles containing liquid which are stored in a refrigerator or freezer, many such articles are spillable and do spill. Such a spill will typically soak into other items or contaminate other foods in the refrigerated compartment. Extensive cleanup efforts are required since the spill will commonly flow down, through the compartment, from shelf to shelf. Therefore, it is desirable to provide containment measures for limiting the area of such a spill. One such measure is a spill resistant shelf. Such a shelf will contain a spill to the shelf and minimize if not preclude the downward flow of the spill through the compartment.

One such spill resistant shelf is disclosed in U.S. Pat. No. 4,934,541, entitled REFRIGERATOR SHELF AND METHOD OF MANUFACTURING and issued on Jun. 19, 1990 to Bussan et al. Therein, a refrigerator shelf is disclosed having a two-piece plastic "picture frame" circumscribing the periphery of a glass plate to provide a spill resistant refrigerator shelf. For liquid spill resistance, a silicon seal should be provided between the upper frame member and the glass plate, as disclosed by Bussan et al.

U.S. Pat. No. 3,633,983, entitled SHELF STRUCTURE and issued on Jan. 11, 1972 to Whitcomb, discloses the use of a glass shelf member which is framed by spaced, parallel side portions, an interconnecting rear portion and a portion extending transversely across the front of the glass. The front, side and rear framing portions are specified as being extruded material and having a glass receiving groove for receiving the glass shelf member. However, a liquid tight seal around the perimeter edge of the glass is not provided or suggested. A spill on this shelf, particularly of a liquid, will seep between the glass and the supporting frame, flowing down through the compartment.

Another problem common to the above discussed shelf structures still remains. That is, items which are spilled upon the shelves can seep between the glass plate shelf member and the surrounding frame members where it is virtually impossible to remove or otherwise clean. Thus and in spite of the sanitary benefits of using glass, an unsanitary condition can easily develop as food stuffs become trapped between the shelf members and frame members of the above-described shelf structures.

Even with the benefit of spill containment as provided by a spill resistant shelf, it can still be a tedious task to remove the spilled item from the shelf. This is especially so with spilled liquids which must be removed from the shelf, typically by sponging or mopping the spill with a rag or the like and conveying it to a bowl or pail. If one attempts to remove the shelf and pour the spill directly into a sink, the shelf will easily tip and the spill will readily pour over the edge of the shelf, defeating the principle purpose of the spill resistant shelf.

Another consideration in designing shelf structures for a refrigerated compartment is the circulation or convection of air through the compartment. It is desirable to provide for some means of circulation in order to maintain a homogeneous temperature distribution and avoid stratification. Without a provision for circulation, the air in the compartment will become stratified, having a range of temperature zones with a relatively warm zone at the top of the compartment and a relatively cold zone at the bottom of the compartment. Therefore, one will typically design the shelf structure to allow for air passage between the edges of the shelf and the walls of the compartment. However, this decreases the shelf surface area according to the amount of space provided between the shelf and the compartment walls. Further, in situations where a framing structure circumscribes the shelf, such as those discussed above, the width of the frame further reduces the available shelf area. Such reductions in shelf area directly reduce the capacity of the refrigerator to hold items. While the reduction in shelf area attributable to air passage around the shelf perimeter is dictated by thermodynamic performance, the lost area attributable to perimeter framing results from structural and design limitations imposed by accommodating the spill resistant shelf.

SUMMARY OF THE INVENTION

Accordingly, the present invention provides a refrigerator shelf having a molded, liquid tight, perimeter rim. The molded rim both maximizes the spill retention capability of the shelf and minimizes the potential for inaccessible entrapment of a spilled material between the perimeter rim and the shelf member. Further, the molded perimeter rim can be made smaller than the perimeter frame of the presently known spill resistant shelf and thereby maximize the available shelf area.

In one aspect of the invention, the perimeter rim is molded around at least a portion of supporting shelf brackets, assuring a secure and durable attachment between the shelf member and the support brackets.

In a further aspect of the invention, a drain is provided for draining a spill from the spill resistant shelf and thereby minimizing the further potential for causing a mess in cleaning up a spill.

In another aspect of the invention, slide tracks are provided along the shelf support brackets for receiving a slidable bin or drawer. In one embodiment the slide tracks are optionally attached to the shelf brackets. In another embodiment, the slide tracks are integrally molded into the shelf support brackets.

In another aspect of the invention, tempered glass is used as the shelf member to enhance light distribution through the refrigerated compartment and to enhance viewing of items supported by the shelving. The sides and back of the shelf are spaced from the walls of the compartment in another aspect of the invention to provide proper circulation around the shelf and the use of the molded perimeter rim allows the formation of a narrow perimeter rim, maximizing the shelf support area.

The present invention provides a durable support rim for a spill resistant refrigerator shelf. The molded perimeter rim maximizes sealing contact between the rim and the shelf member for enhanced spill retention and to minimize the potential for entrapment of food stuffs between the perimeter rim and the shelf member, also minimizing the potential for subsequent development of an unsanitary condition. The use of a molded rim in accordance with the present invention offers enhanced aesthetics by minimizing seams and joints associated with the rim and giving a more streamlined appearance. Such aesthetic benefits are also provided by the use of molded slide tracks for a bin storage unit which can be integrally molded as a single piece with the perimeter rim and the shelf support brackets.

These and other objects, advantages and features of the present invention will become apparent upon review of the following specification in conjunction with the drawings.

DESCRIPTION OF THE PREFERRED EMBODIMENTS

Figure 1:
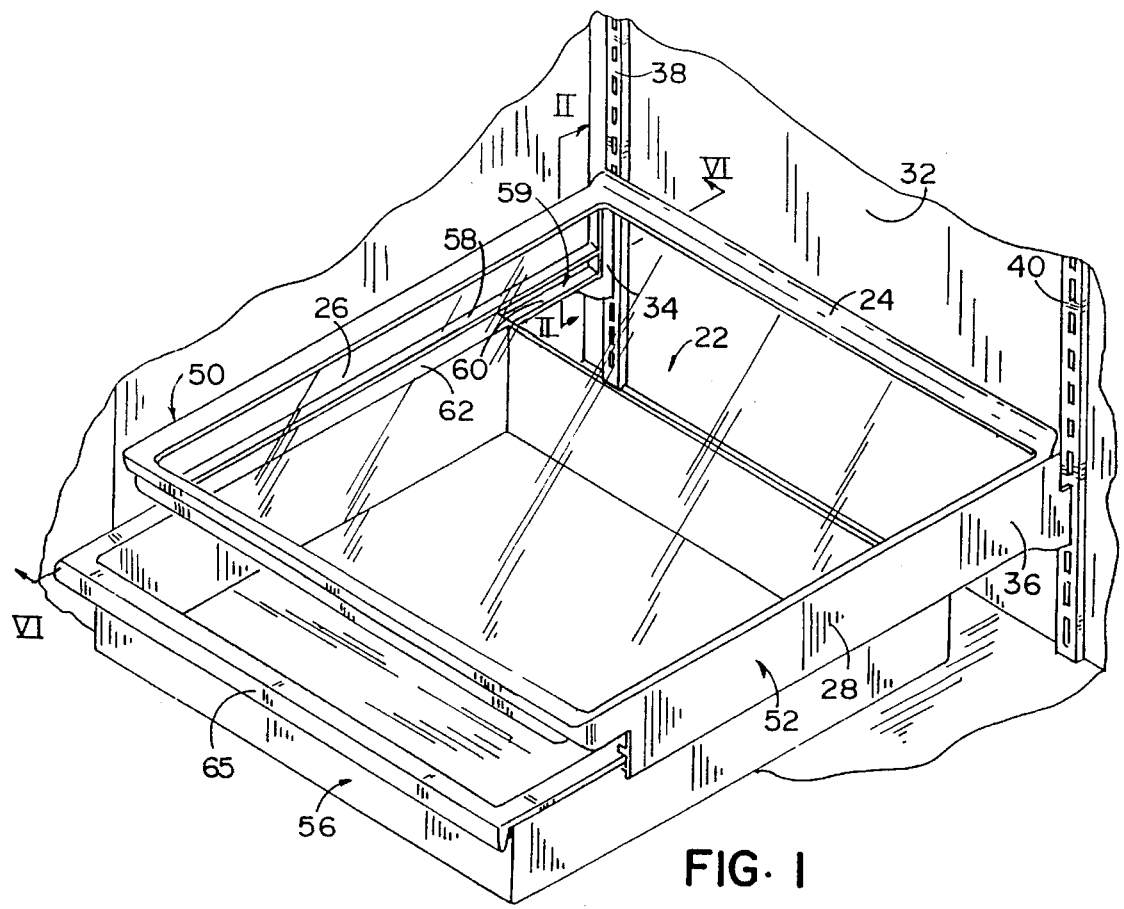
FIG. 1 is a fragmentary perspective view of the interior of a refrigerator showing a shelf according to the present invention.

Referring now to the drawings in greater detail and FIG. 1 in particular, a refrigerator shelf assembly 20, according to the present invention, comprises a shelf panel 22, a perimeter rim 24 and support brackets 26, 28.

Figure 2:
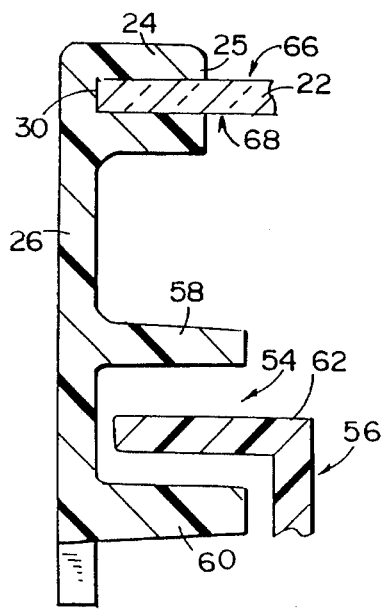
FIG. 2 is a sectional view along section line II—II of FIG. 1.
Figure 3:
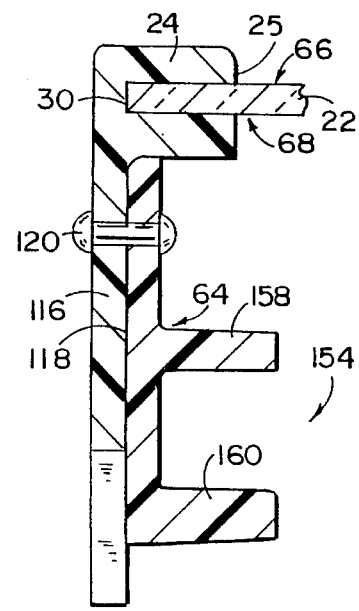
FIG. 3 is an alternative embodiment of FIG. 2.

Shelf panel 22 may be contoured to facilitate a variety of specific purposes, but generally provides a planar surface to support items placed thereon for storage in a refrigerator. Shelf panel 22 may also be formed from a light transmitting material, preferably optically clear, tempered glass, to enhance light distribution through the refrigerator compartment. Shelf panel 22 has a perimeter edge 30 about which perimeter rim 24 is molded (FIGS. 1–3).

Figure 6:
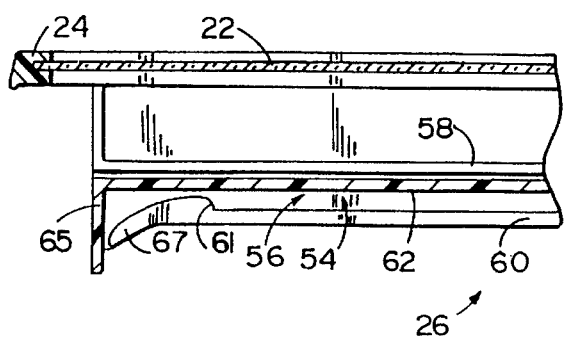
FIG. 6 is a sectional view along section line VI—VI of FIG. 1 with the storage bin in a closed position.
Figure 7:
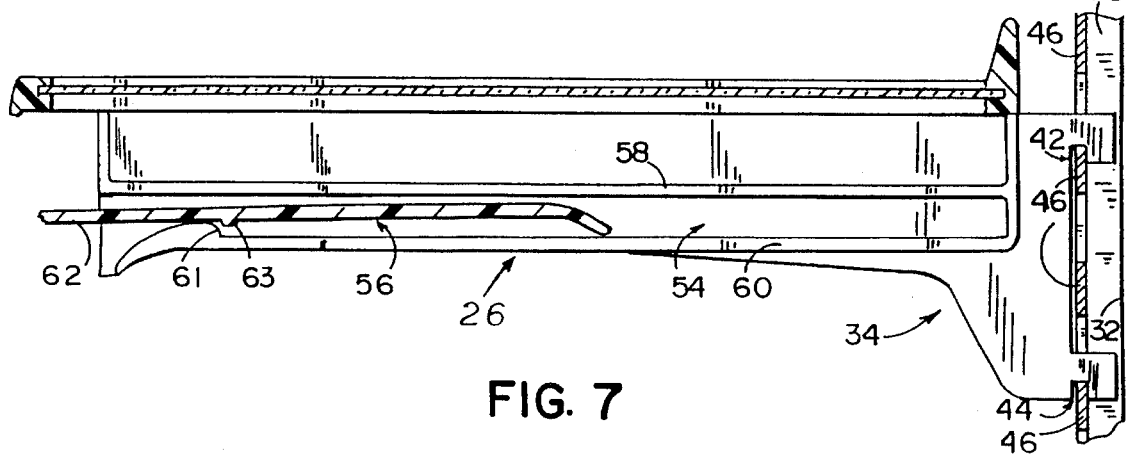
FIG. 7 is a sectional view along section line VI—VI of FIG. 1 with the storage bin in an open position.

Shelf assembly 20 is preferably cantilevered forward by brackets 26, 28 from a rear wall 32 of a refrigerator, and is preferably used as a vertically adjustable shelf. Therefore, brackets 26,28 are elongated members, having rear ends 34, 36 which are preferably adapted for releasable engagement with shelf tracks 38, 40, provided on rear wall 32 of the refrigerator as is commonly practiced (FIGS. 1, 6, and 7). Recesses 42, 44, formed in ends 34, 36 function as hooks for engaging rungs 46 in tracks 38, 40 to support brackets 26, 28. Thus, shelf assembly 20 may be positioned at a plurality of locations spaced vertically along tracks 38, 40. Further, shelf assembly 20 is preferably sized to provide air circulation space between the side walls of the refrigerator and the side and rear edges of shelf assembly 20. An air circulation space 48, for example, is provided between perimeter rim 24 and rear wall 32 (FIG. 6).

Brackets 26, 28 extend along at least a portion of opposing sides 50, 52 of shelf assembly 20. In the most preferred embodiment, perimeter rim 24 and support brackets 26, 28 are integrally molded in one piece (FIG. 2). Shelf assembly 20 may optionally be provided with a pair of slide tracks 54 for slidably receiving and supporting a storage bin or drawer 56 (FIGS. 1, 2, 6 and 7). Each slide track 54 is defined between spaced upper and lower slide rails 58, 60. Each slide track 54 receives and guides a corresponding outward extending flange portion 62 of drawer 56.

Drawer 56 may be a metal stamping or plastic molding as is commonly known and extends to an open position for access to the inside of drawer 56. A forward stop 61 is formed along lower rail 60 for engagement with a projecting stop 63 on drawer flange 62 to prevent accidental overextension of drawer 56 (FIGS. 6 and 7). If removal of drawer 56 from slide track 54 is desired, this is easily accomplished by lifting the front end of drawer 56 so that stop 63 passes above stop 61. Conversely, drawer 56 may be positioned under shelf panel 22 in a closed position (FIG. 6). A flange 65 is provided across the front of drawer 56 to provide a handle for pulling drawer 56 to its open position or pushing the drawer to its closed position. Flange 65 in combination with front end 67 of lower rail 60 provide a closure stop for positioning drawer 56 in the closed position.

Perimeter rim 24, support brackets 26, 28 and, optionally, upper and lower slide rails 58, 60 are preferably molded in a convenient one-step process. During assembly, shelf panel 22 is held and positioned within a mold while a moldable material, from which perimeter rim 24, support brackets 26, 28 and, optionally, slide rails 58, 60 are made, is injected and flows into a continuous cavity provided in the mold around perimeter edge 30 of shelf panel 22, thereby encapsulating perimeter edge 30, forming perimeter rim 24, support brackets 26, 28, and slide rails 58, 60 (FIG. 2). The moldable material may include copolymer plastics such as a combination of ethylene and polypropylene or other structural, resinous plastics such as ABS or polyvinyl-chloride. Further, a coloration pigment to provide desired colors may be added to the moldable plastic prior to molding. For example, titanium dioxide may be added for a white coloration.

As the moldable material cures, i.e., cools, hardens, and sets up, it becomes a tough and resilient mass, extending continuously around the perimeter of edge 30 of shelf panel 22, forming support brackets 26, 28 and, optionally, slide rails 58, 60. Perimeter rim 24 is molded to extend above the top surface 66 of shelf panel 22 and is specifically molded to define a continuous vertical wall 25 near the perimeter edge 30 of shelf panel 22. The forming of perimeter rim 24 by molding as a single, continuous piece around perimeter edge 30 creates a liquid tight seal between perimeter rim 24 and shelf panel 22. This liquid tight seal and the configuration of perimeter rim 24 with continuous vertical wall 25 combine to form a spill dam for containing spills which may occur upon shelf panel 22.

Again most preferably, slide rails 58, 60 are integrally molded with support brackets 26, 28 (FIG. 2). However, in an alternative embodiment, a support bracket 116 may be molded without slide track 54 and a slide track 154 may be added to a support bracket 116 by attaching a slide bracket 64 to the inside surface of support bracket 116 (FIG. 3). Slide bracket 64 may be connected to support bracket 116 by rivets 120 or by other commonly known fastening methods, and includes spaced slide rails 158, 160 which function in the same manner as rails 58, 60.

Figure 4:
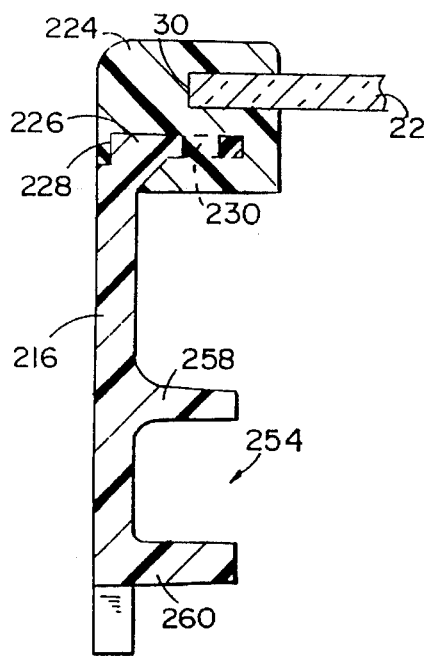
FIG. 4 is a second alternative embodiment of of FIG. 2.

In a second alternative embodiment, a support bracket 216 may be molded separately from a perimeter rim 224 (FIG. 4). Support bracket 216 has a support flange portion 226 which projects inward, under shelf panel 22 from the top edge 228 of support bracket 216. A corresponding, mirror image support bracket (not shown) to support bracket 216 is used opposite support bracket 216, across shelf panel 22. A series of apertures 230 may be defined in flange 226 to enhance mechanical attachment between support bracket 216 and perimeter rim 224. During assembly, shelf panel 22, support bracket 216 and the opposing support bracket are held and positioned to project into a cavity, surrounding perimeter edge 30 of shelf panel 22, within a mold while a moldable material is injected and flows into the mold cavity as disclosed above, around the perimeter edge 30 of shelf panel 22 and flange portion 226, encapsulating the perimeter edge 30 and flange portion 226 of each support bracket. Support bracket 216 is preferably molded with integral slide rails 258, 260, defining slide track 254.

Figure 5:
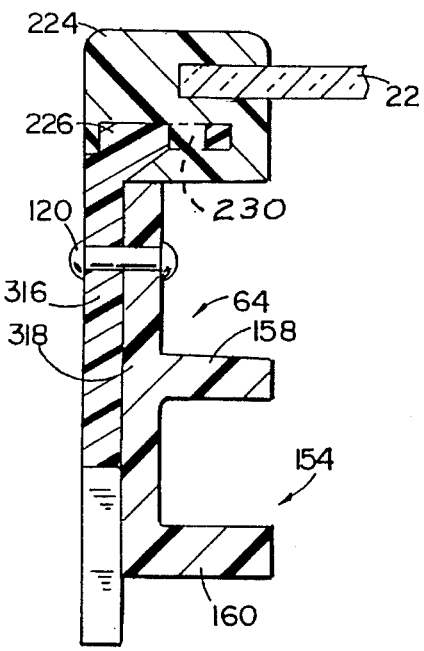
FIG. 5 is a third alternative embodiment of FIG. 2.

In a third alternative embodiment, a support bracket 316, similar to bracket 216 above, is molded without slide rails (FIG. 5). As with bracket 116 above, slide bracket 64 may be optionally attached to the inside surface 318 of support bracket 316, in the same manner as discussed with support bracket 116 above, for providing slide track 154.

Figure 5A:
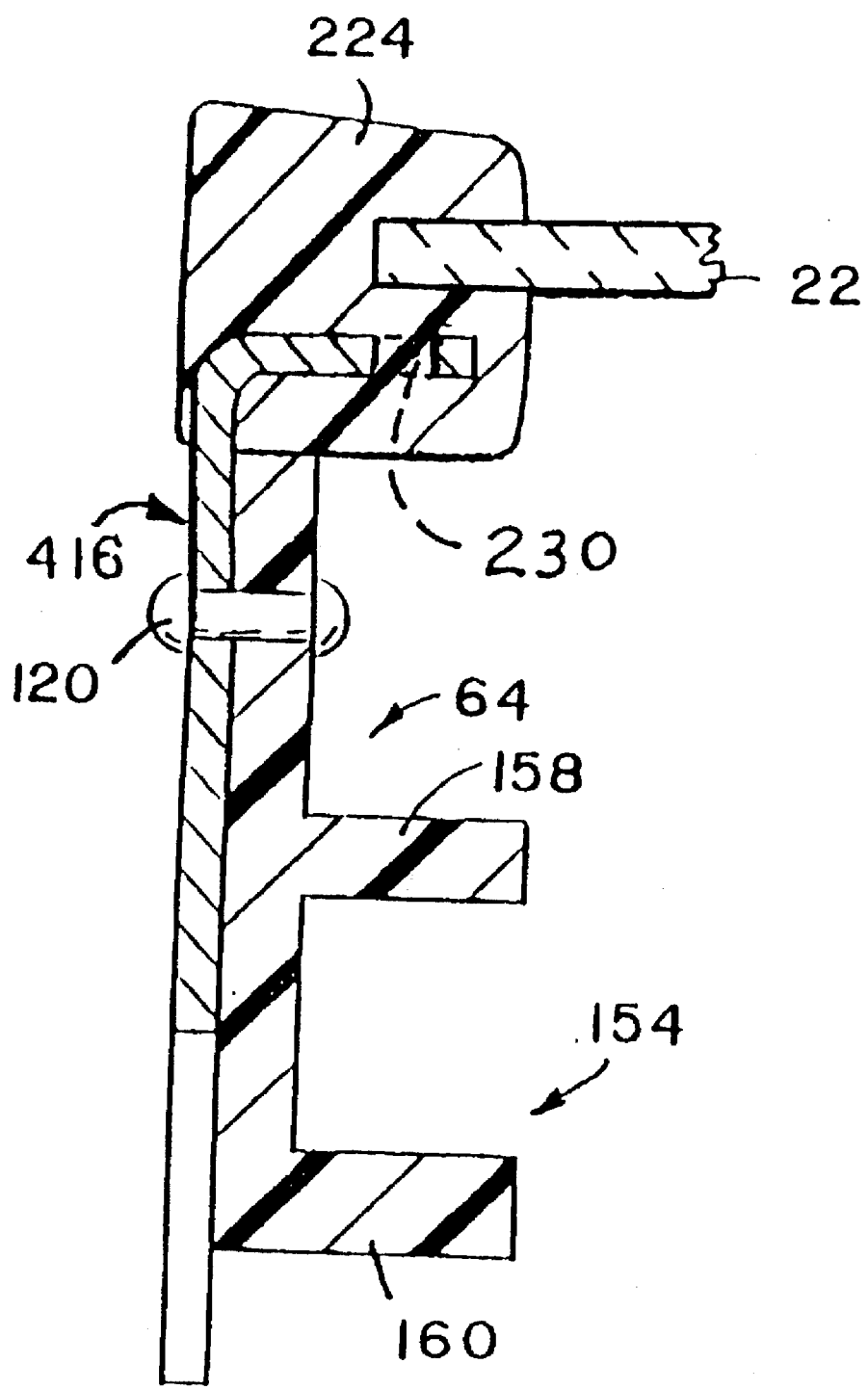
FIG. 5A is a fourth alternative embodiment of FIG. 2.

In a fourth alternative embodiment, slide bracket 64 may also be used in the manner disclosed above, but with a refrigerator shelf assembly which incorporates a metal support bracket 416 (FIG. 5A).

Figure 8:
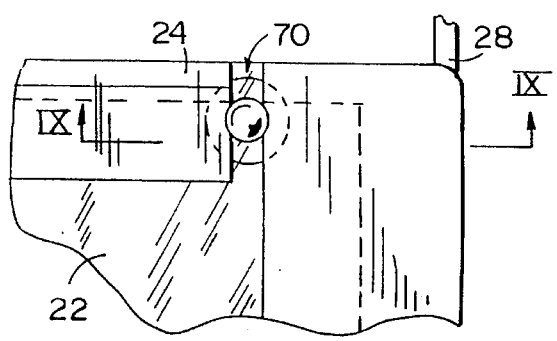
FIG. 8 is a fragmentary plan view of a first alternative embodiment of a drain for the shelf of FIG. 1.
Figure 9:
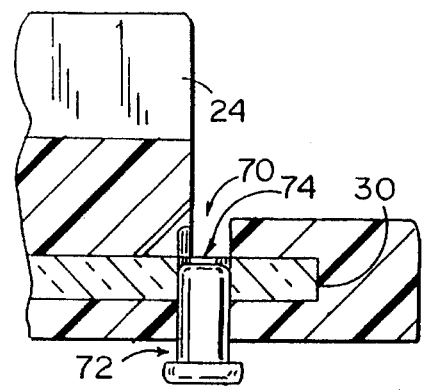
FIG. 9 is a sectional view along section line IX—IX of FIG. 8.

For convenience in removing a spill, especially a liquid spill, a drain may be provided in the refrigerator shelf assembly 20. In a first embodiment of a drain for refrigerator shelf assembly 20, drainage channel 70 may be molded into perimeter rim 24 (FIGS. 8 and 9). A drain plug 72 is used to close channel 70 until such time as a spill occurs on the shelf assembly 20 and a user wishes to withdraw plug 72 to drain the spill. A drain hole 74 is provided in channel 70, adjacent perimeter edge 30 of shelf panel 22 for receiving drain plug 72 from the underside of shelf assembly 20. Drain plug 72 and hole 74 are sized so that friction holds drain plug 72 in plug hole 74. Preferably, plug 72 is molded from the same material as perimeter rim 24 and is resilient such that it tightly seals hole 74 and compressingly engages the facing surfaces of rim 24 adjacent channel 70. For balanced esthetics, a second drain or a nonfunctional drain look-alike may be symmetrically located on shelf assembly 20.

Figure 10:
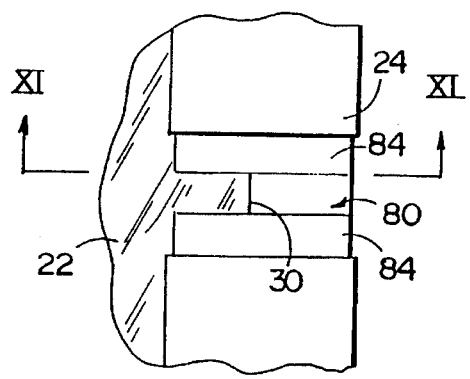
FIG. 10 is a fragmentary plan view of a second alternative embodiment of a drain for the shelf of FIG. 1.
Figure 11:
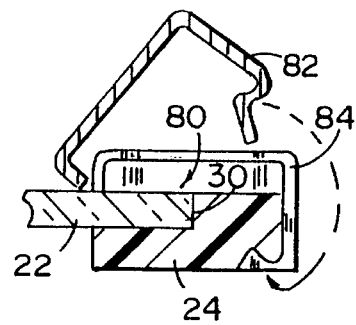
FIG. 11 is a sectional view along section line XI—XI of FIG. 10.

A second, alternative embodiment of a drain for shelf assembly 20 is shown in. FIGS. 10 and 11. A drainage channel 80 is molded in perimeter rim 24. A flush fitting, clip-like drain plug 82 clips over perimeter rim 24 to close drainage channel 80. A shoulder 84, adjacent to and on either side of drainage channel 80, is recessed into perimeter rim 24 so that plug 82 will fit flush with the outer surface of perimeter rim 24 and is molded to conform to the shape of the inside of plug 82 for good sealing contact. Plug 82 is preferably molded from the same material as perimeter rim 24, but may also be formed from stainless steel or other suitable materials. For balanced esthetics, a second drain or a nonfunctional drain look-alike may be symmetrically located on shelf assembly 20.

Figure 12:
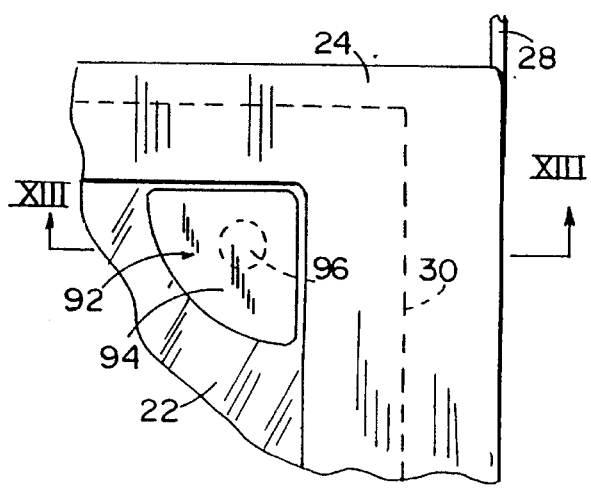
FIG. 12 is a fragmentary plan view of a third alternative embodiment of a drain for the shelf of FIG. 1.
Figure 13:
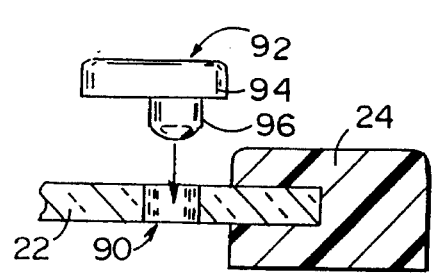
FIG. 13 is a sectional view along section line XIII—XIII of FIG. 12.

A third, alternative embodiment of a drain for shelf assembly 20 is shown in FIGS. 12 and 13. A drain hole 90 is provided through shelf panel 22 and a drain plug 92 having a triangularly shaped head 94 and a cylindrical plug body 96 is provided to close drain hole 90. The shape of head 94 matches the inside corner of rim 24 adjacent hole 90. Preferably, plug 92 is formed from the same material as perimeter rim 24. For balanced esthetics, a second drain or a nonfunctional drain look-alike may be symmetrically located on shelf assembly 20.

Figure 14:
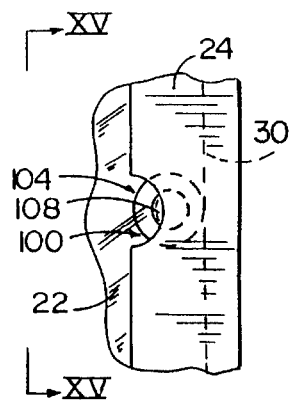
FIG. 14 is a fragmentary plan view of a fourth alternative embodiment of a drain for the shelf of FIG. 1.
Figure 15:
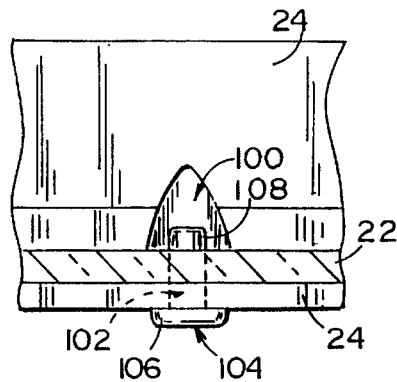
FIG. 15 is a sectional view along section line XV—XV of FIG. 14.

A fourth, alternative embodiment of a drain for shelf assembly 20 is shown in FIGS. 14 and 15. A notch 100 is molded in perimeter rim 24, near perimeter edge 30 of shelf panel 22. A drain hole 102, through shelf panel 22 and the bottom of rim 24, is aligned with notch 100. A drain plug 104, having an enlarged head 106 and cylindrical body 108, is provided to close drain hole 102. Preferably, plug 104 is formed from the same material as perimeter rim 24.

Figure 16:
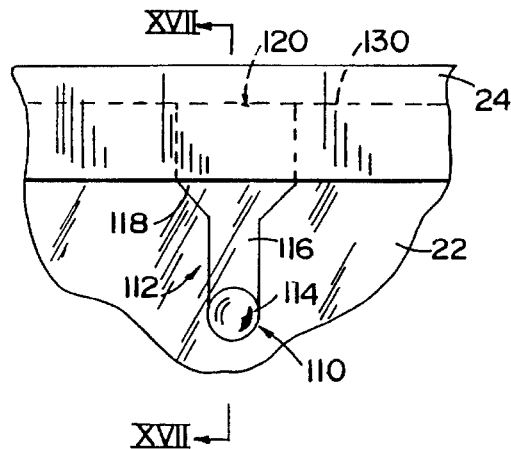
FIG. 16 is a fragmentary plan view of a fifth alternative embodiment of a drain for the shelf of FIG. 1.
Figure 17:
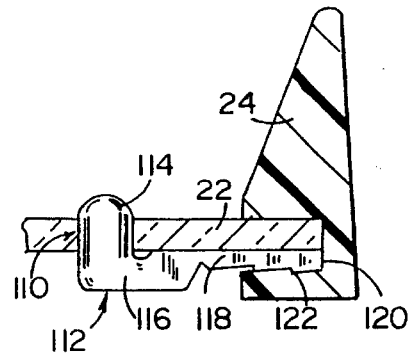
FIG. 17 is a sectional view along section line XVII—XVII of FIG. 16.

A fifth, alternative embodiment of a drain for shelf assembly 20 is shown in FIGS. 16 and 17. A drain hole 110 is provided through shelf panel 22, near perimeter edge 130. A drain plug 112 having a stopper portion 114, a flexible arm 116 and a base portion 118 is provided to close drain hole 110. A notch 120 is molded into perimeter rim 24 to receive base 118 of plug 112. A series of transverse ribs 122 are formed in base 118 for engagement with perimeter rim 24.to resist removal of base 118 from notch 120. Arm 116 extends toward hole 110 from base 118 and provides a flexible and springy positioning member for plug 112. Plug 112 is preferably formed from the same material as perimeter rim 24.

Figure 18:
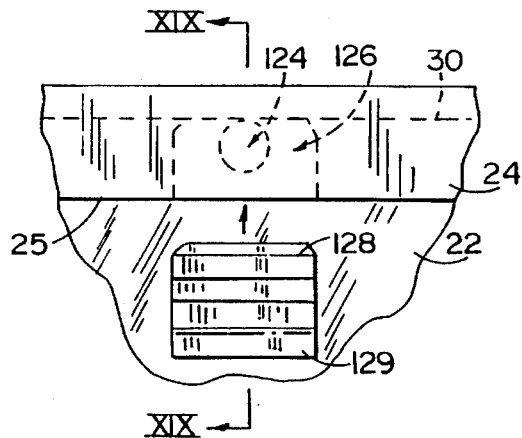
FIG. 18 is a fragmentary plan view of a sixth alternative embodiment of a drain for the shelf of FIG. 1.
Figure 19:
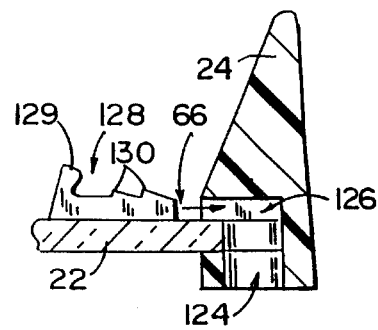
FIG. 19 is a sectional view along section line XIX—XIX of FIG. 18.

A sixth, alternative embodiment of a drain for shelf assembly 20 is shown in FIGS. 18 and 19. A drain hole 124 is provided adjacent perimeter edge 30. Drain hole 124 extends through shelf member 22 and perimeter rim 24 as shown. A notch 126 is molded into perimeter rim 24. Notch 126 extends from vertical wall 25 to perimeter edge 30 and aligns with drain hole 124 to define a passageway from top surface 66. A drain plug 128, corresponding to notch 126, is removably received in notch 126 for closing and sealing drain hole 124. Drain plug 128 is preferably molded from the same material as perimeter rim 24 and is sized for friction fit with notch 126. A large projecting rib 129 forms a handle for plug 128 and small ribs 130 may be provided to enhance insertion and removal of plug 128.

The above description is considered that of the preferred embodiment only. Modifications of the invention will occur to those who make or use the invention. Therefore, it is understood that the embodiments shown in the drawings and described above are merely for illustrative purposes and are not intended to limit the scope of the invention, which is defined by the following claims as interpreted according to the principles of patent law.

The embodiments of the invention in which an exclusive property or privilege is claimed are defined as follows:

1. A refrigerator shelf for use in a refrigerated compartment comprising:

a support for supporting said shelf within the refrigerated compartment;

a shelf panel supported by said support, said shelf panel having a perimeter edge and a top surface for receiving and supporting an article set thereon; and a rim extending along at least a portion of said perimeter edge of said shelf panel and between said support and said perimeter edge of said shelf panel;

said support having a flange extending into said rim, said flange including an aperture; said rim having an attachment portion extending into said aperture to provide a positive mechanical connection between said support and said rim.

2. The refrigerator shelf defined in claim 1 wherein said shelf panel also includes a bottom surface; said rim including an upper portion engaging said top surface of said shelf panel and a lower portion engaging said bottom surface of said shelf panel and wherein said attachment portion of said rim extends through said aperture and interconnects said upper portion with said lower portion.

3. The refrigerator shelf defined in claim 2 wherein said flange extends inwardly toward said shelf panel from a side of said rim; said aperture extending through said flange.

4. The refrigerator shelf defined in claim 3 wherein said attachment portion of said rim extending through said aperture is oriented generally perpendicular to said flange.

5. The refrigerator shelf defined in claim 1 wherein said flange extends parallel to and partially under said shelf; said aperture extends through said flange.

6. The refrigerator shelf defined in claim 2, wherein said rim, including said upper portion, said lower portion, and said attachment portion, is formed of a moldable material, said rim being molded on and secured to both said perimeter edge and to said flange.

7. The refrigerator shelf defined in claim 1, wherein said rim is formed of a moldable material, said rim being molded on and secured to both said perimeter edge and to said flange.

8. A refrigerator shelf for use in a refrigerated compartment comprising:

a support for supporting said shelf within the refrigerated compartment;

a shelf panel supported by said support, said shelf panel having a perimeter edge, a top surface for receiving and supporting an article set thereon, and a bottom surface; said support having a flange and an aperture extending through said flange, said flange being oriented generally parallel to said shelf panel;

a rim extending along at least a portion of said perimeter edge of said shelf panel and between said support and said perimeter edge of said shelf panel, said rim including an upper portion engaging said top surface of said shelf panel and a lower portion engaging said bottom surface of said shelf panel; and means for providing a positive mechanical connection between said support and said rim including an attachment portion extending through said aperture in said support flange and interconnecting said upper rim portion with said lower rim portion, said attachment portion being oriented generally perpendicular to said flange.

9. The refrigerator shelf defined in claim 8, wherein said rim is formed in one piece.

10. A refrigerator shelf for use in a refrigerated compartment comprising:

a shelf panel, said shelf panel having a perimeter edge, a top surface for receiving and supporting an article thereon, and a bottom surface;

a rim extending along at least a portion of said perimeter edge of said shelf panel, said rim being connected with said shelf panel at said perimeter edge;

a support member for supporting said shelf within the refrigerated compartment, said support member being connected with said shelf panel by said rim said perimeter edge to support said shelf panel, said support member having a first portion extending into said rim and an aperture in said first portion; said rim having an attachment portion extending into said aperture, said rim and said support member being mechanically fastened by said attachment portion of said rim extending into said aperture.

11. The refrigerator of claim 10, wherein said rim is formed of a moldable material and is molded on said first portion of said support member and on said perimeter edge of said shelf panel.

12. The refrigerator shelf defined in claim 10 wherein said rim includes an upper portion engaging said top surface of said shelf panel and a lower portion engaging said bottom surface of said shelf panel and wherein said attachment portion of said rim extends through said aperture and interconnects said upper portion with said lower portion.

13. The refrigerator shelf defined in claim 12 wherein said first portion of said support member includes a flange, said aperture extending through said flange, and said attachment portion of said rim extends through said aperture.

14. The refrigerator shelf defined in claim 13 wherein said attachment portion of said rim extending through said aperture is oriented generally perpendicular to said flange.

15. The refrigerator shelf defined in claim 12, wherein said rim, including said upper portion, said lower portion, and said attachment portion, is formed of a moldable material, said rim being molded on and secured to both said perimeter edge and to said first portion of said support member.

16. A refrigerator shelf for use in a refrigerator compartment comprising:

a shelf panel, said shelf panel having a perimeter edge, a top surface for receiving and supporting an article thereon, and a bottom surface;

a rim extending along at least a portion of said perimeter edge of said shelf panel, said rim being connected with said shelf panel at said perimeter edge, said rim including an upper portion engaging said top surface of said shelf panel, a lower portion engaging said bottom surface of said shelf panel; and an attachment portion; and a support member for supporting said shelf within the refrigerated compartment, said support member being connected with said shelf panel by said rim adjacent to said perimeter edge to support said shelf panel, said support member having a flange with an aperture extending through said flange, said flange being oriented generally parallel to said shelf panel, said attachment portion extending through said aperture and interconnecting said upper portion of said rim with said lower portion of said rim, said attachment portion of said rim also being oriented generally perpendicular to said flange, said rim and said support member being mechanically fastened by said attachment portion of said rim extending into said aperture.

17. The refrigerator shelf defined in claim 16, wherein said rim is formed in one piece.

18. A refrigerator shelf for use in a refrigerated compartment comprising:

a support member for supporting said shelf within the refrigerated compartment, said support member having a flange with an opening extending through said flange;

a shelf panel supported by said support member, said shelf panel having a perimeter edge and a top surface for receiving and supporting an article thereon; and a rim extending along at least a portion of said perimeter edge of said shelf panel and interconnecting said support member and said shelf panel; said flange extending within said rim adjacent said shelf panel; said rim having an attachment portion extending into said opening of said flange.

19. The refrigerator shelf defined in claim 18, wherein said rim is formed of a moldable material and is molded on said flange of said support member and on said perimeter edge of said shelf panel.

20. The refrigerator shelf defined in claim 18 wherein said rim includes an upper portion engaging said top surface of said shelf panel and a lower portion engaging said bottom surface of said shelf panel, and wherein said attachment portion of said rim extends through said aperture and interconnects said upper portion with said lower portion.

21. The refrigerator shelf defined in claim 20, wherein said rim, including said upper portion, said lower portion, and said attachment portion, is formed of a moldable material, said rim being molded on and secured to both said perimeter edge and to said flange.

22. The refrigerator shelf defined in claim 20 wherein said attachment portion of said rim extending through said aperture is oriented generally perpendicular to said flange.

23. A refrigerator shelf for use in a refrigerated compartment comprising:

a support member for supporting said shelf within the refrigerated compartment, said support member having a flange with an opening extending through said flange;

a shelf panel supported by said support member said shelf panel having a perimeter edge and a top surface for receiving and supporting an article thereon; and a rim extending along at least a portion of said perimeter edge of said shelf panel and interconnecting said support member and said shelf panel, said rim including an upper portion engaging said top surface of said shelf panel and a lower portion engaging said bottom surface of said shelf panel, said rim also including an attachment portion extending through said opening and interconnecting said upper portion of said rim with said lower portion of said rim, said attachment portion of said rim being oriented generally perpendicular to said flange, said flange being oriented generally parallel to said shelf panel.

24. The refrigerator shelf defined in claim 22, wherein said rim is formed in one piece.

* * * * *

UNITED STATES PATENT AND TRADEMARK OFFICE
CERTIFICATE OF CORRECTION

PATENT NO. : 5,524,981
DATED : June 11, 1996
INVENTOR(S) : Robert S. Herrmann et al.

It is certified that error appears in the above-indentified patent and that said Letters Patent is hereby corrected as shown below:

Column 5, line 63:
        After "in" delete --,--.

Column 6, line 33:
        After "24" delete --,--.

Column 7, line 51:
        Before "panel" delete --,--.

Column 8, line 6:
        After "rim" insert --adjacent--.

Column 8, line 13:
        Delete "of" and insert therefor --shelf defined in--.

UNITED STATES PATENT AND TRADEMARK OFFICE
CERTIFICATE OF CORRECTION

PATENT NO. : 5,524,981
DATED : June 11, 1996
INVENTOR(S) : Robert S. Herrmann et al.

It is certified that error appears in the above-indentified patent and that said Letters Patent is hereby corrected as shown below:

Cross Reference to Related Applications should read as follows:
--This is a continuation of Application Serial No. 07/721,104, filed June 25, 1991, now United States Patent No. 5,273,354, which is a continuation in part of Serial No. 07/665,661, filed March 7, 1991, now United States Patent No. 5,362,145.--

Column 10, line 6:
Insert --,-- after "member".

Column 10, line 7:
After "edge delete "and" and insert --,--.

Column 10, line 8:
Insert --and a bottom surface-- after "thereon".

Column 10, Claim 23, line 9,
After "opening" insert --in said flange--.

Signed and Sealed this

Twenty-seventh Day of May, 1997

Attest:

BRUCE LEHMAN

*Attesting Officer*  *Commissioner of Patents and Trademarks*